United States Patent

Nomura et al.

[11] Patent Number: 6,055,111
[45] Date of Patent: Apr. 25, 2000

[54] PLASTIC LENS AND METHOD OF MAKING A PLASTIC LENS

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/092,050

[22] Filed: Jun. 5, 1998

[30] Foreign Application Priority Data

Jun. 27, 1997 [JP] Japan ................................ 1711905

[51] Int. Cl.⁷ .............................. G02B 3/00; G02B 27/02; G02B 7/02
[52] U.S. Cl. ........................... 359/642; 359/804; 359/811; 359/819
[58] Field of Search ...................... 359/642, 804, 359/811, 819

[56] References Cited

U.S. PATENT DOCUMENTS

| 5,642,235 | 6/1997 | Ichikawa | 359/811 |
| 5,905,599 | 5/1999 | Nomura | 359/819 |

*Primary Examiner*—Georgia Epps
*Assistant Examiner*—Michael A Lucas
*Attorney, Agent, or Firm*—Leydig, Voit & Mayer, Ltd.

[57] ABSTRACT

A plastic lens which is easy to mold and has favorable optical precision. This plastic lens has a flange at the outer periphery of an optically functioning portion, a part of the peripheral surface of the flange being provided with a gate-positioning projection, and a side face of the gate-positioned projection including a cut-off portion.

5 Claims, 6 Drawing Sheets

PLASTIC LENS AND METHOD OF MAKING A PLASTIC LENS

BACKGROUND OF THE INVENTION

1. Field of the Invention

The present invention relates to a plastic lens suitably used for an optical pickup and the like, and a method of making such plastic lens.

2. Related Background Art

Lenses which are made of plastic have been used, because they are easy to make and have some other useful reasons. In general, such a plastic lens is made by injection molding, and has an optical functioning portion and a brim-shaped flange formed at the outer periphery of the optical functioning portion. The flange is mainly utilized as an attachment for fixing the lens.

SUMMARY OF THE INVENTION

It is an object of the present invention to provide a plastic lens that is easy to mold and has a favorable optical precision.

The plastic lens in accordance with the present invention has a flange formed around an optically functioning portion, a gate-positioned projection formed on a part of a surface of the flange, and a cut-off portion formed at a side face of the gate-positioned projection by cutting off a superfluous part molded at the injection-gate.

When the plastic lens in accordance with the present invention is molded by injection molding, a molten resin is injected into a cavity from a injection-gate opened to the molding space for forming the gate-positioned projection. After the molding, the superfluous part formed at the portion corresponding to the gate is cut off, so as to form the cut-off portion. In this manner, the opening area of the gate can be sufficiently secured, thus allowing a sufficient amount of molten resin to be injected per unit time. Consequently, a thus manufactured plastic lens would have a favorable optical precision.

Preferably, in addition to the above-mentioned gate-positioned projection, at least one protect projection is formed on the surface of the flange, such that the height of each of the gate-positioned projection and the protect projection is greater than the maximum height of the optically functioning portion. As a consequence, an object such as CD-ROM disc would come into contact with the gate-positioned projection and the protect projection before contacting the optically functioning portion, whereby the optically functioning portion can be prevented from being damaged.

Also, on the surface of the flange, the distance between the gate-positioned projection and the protect projection adjacent to the gate-positioned projection is preferably made longer than the distance between the gate-positioned projection and the optically functioning portion. As a consequence, within the cavity upon molding, the molding space for forming the gate-positioned projection is filled with the molten resin, at first. And then, the molten resin reaches the molding space for forming the optically functioning portion before reaching the molding space for forming the protect projection. As a result, the molten resin fills the molding space for forming the optically functioning portion more securely at an early stage. Thus manufactured plastic lens would have a favorable optical precision.

The method of making a plastic lens in accordance with the present invention uses a molding die having a particular cavity and a particular injection-gate to inject resin. The cavity comprises a molding space for forming an optically functioning portion, a molding space for forming a flange formed around the optically functioning portion, and a molding space for forming a gate-positioned projection formed on a part of a surface of the flange. And the injection-gate is opened to the molding space for forming the gate-positioned projection.

In the method of the present invention, upon molding the lens, the molten resin is injected into the cavity through the gate opened to the molding space for forming the gate-positioned projection. As a consequence, the molding space for forming the gate-positioned projection can sufficiently secure the opening area of the gate, thus allowing a sufficient amount of molten resin to be injected per unit time. Also, the molten resin can fill the molding space for forming the optically functioning portion at an early stage. As a result, thus manufactured plastic lens would have a favorable optical precision.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 8:
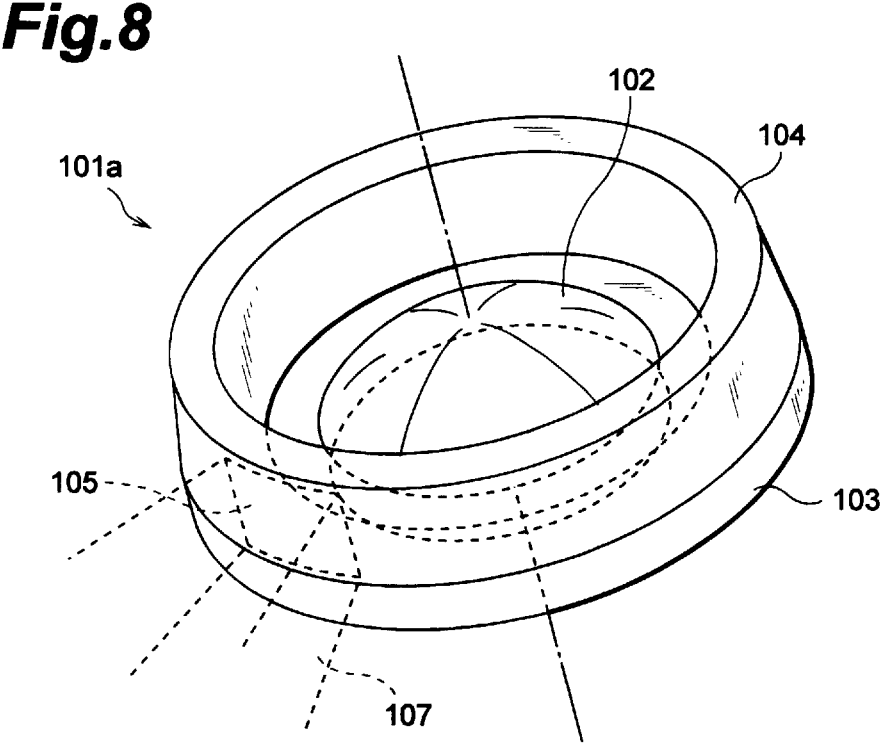
FIG. 8 is a perspective view showing a thinned and downsized plastic lens (first example)

As instruments such as CD-ROM drives have recently been becoming thinner and smaller, there is a demand for further reducing the thickness and size of plastic lenses employed for optical pickups of these instruments. FIG. 8 shows an example of thinned and downsized elastic lens which is under study. This plastic lens 101a has an annular wall 104 over the whole circumference of the outer peripheral portion of a flange 103 in order to protect an optically functioning portion 102. Injection molding of the plastic lens 101a is carried out within a die such as that shown in FIG. 9.

Figure 9:
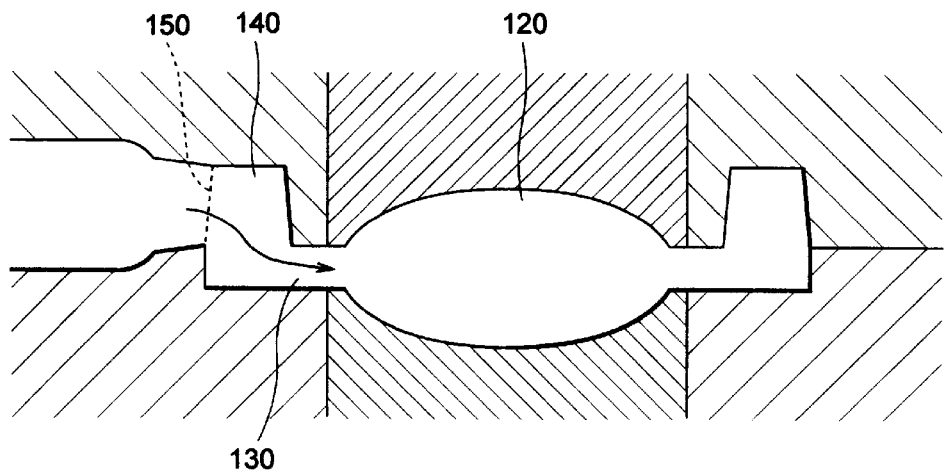
FIG. 9 is a sectional view of a die for molding the plastic lens shown in FIG. 8.
Figure 10:
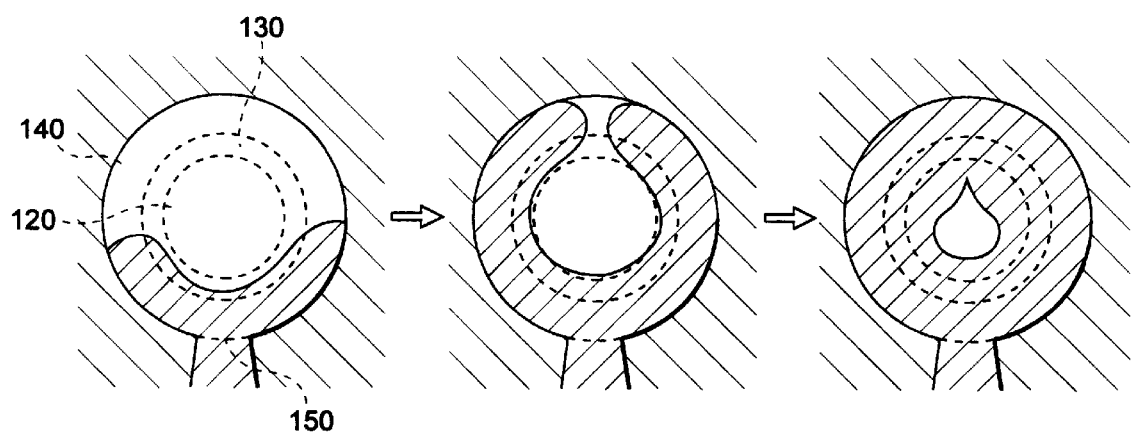
FIG. 10 is a transverse sectional view showing manufacturing steps of the plastic lens shown in FIG. 8.

As shown in FIG. 9, upon molding the plastic lens 101a, a molten resin is injected into the cavity of the die through a gate 150. Since a molding space 130 for forming the flange 103, which is thinned due to the thinning and downsizing of the lens, is narrow, thus injected molten resin is hard to flow toward a molding space 120 for forming the optically functioning portion (in the pointed direction by arrow in FIG. 9), whereby a molding space 140 for forming the annular wall 104 is filled with the molten resin earlier (see FIG. 10). After filling the molding space 140 for forming the annular wall 104, the molten resin fills the molding space 120 for forming the optically functioning portion 102.

In order to provide the optically functioning portion 102 with a favorable optical precision, it is desirable for the molten resin to fill the molding space 120 for forming the optically functioning portion 102 as early as possible before the solidification of molten resin progresses. In the case where the lens is simply thinned and downsized, however, the molten resin would fill the molding space 140 for forming the annular wall 104 before filling the molding space 120 for forming the optically functioning portion 102, since the molding space 130 for forming the flange 103 is narrow as shown in FIG. 9. As a result, thus molded plastic lens 101a may not exhibit a favorable optical precision.

Figure 11:
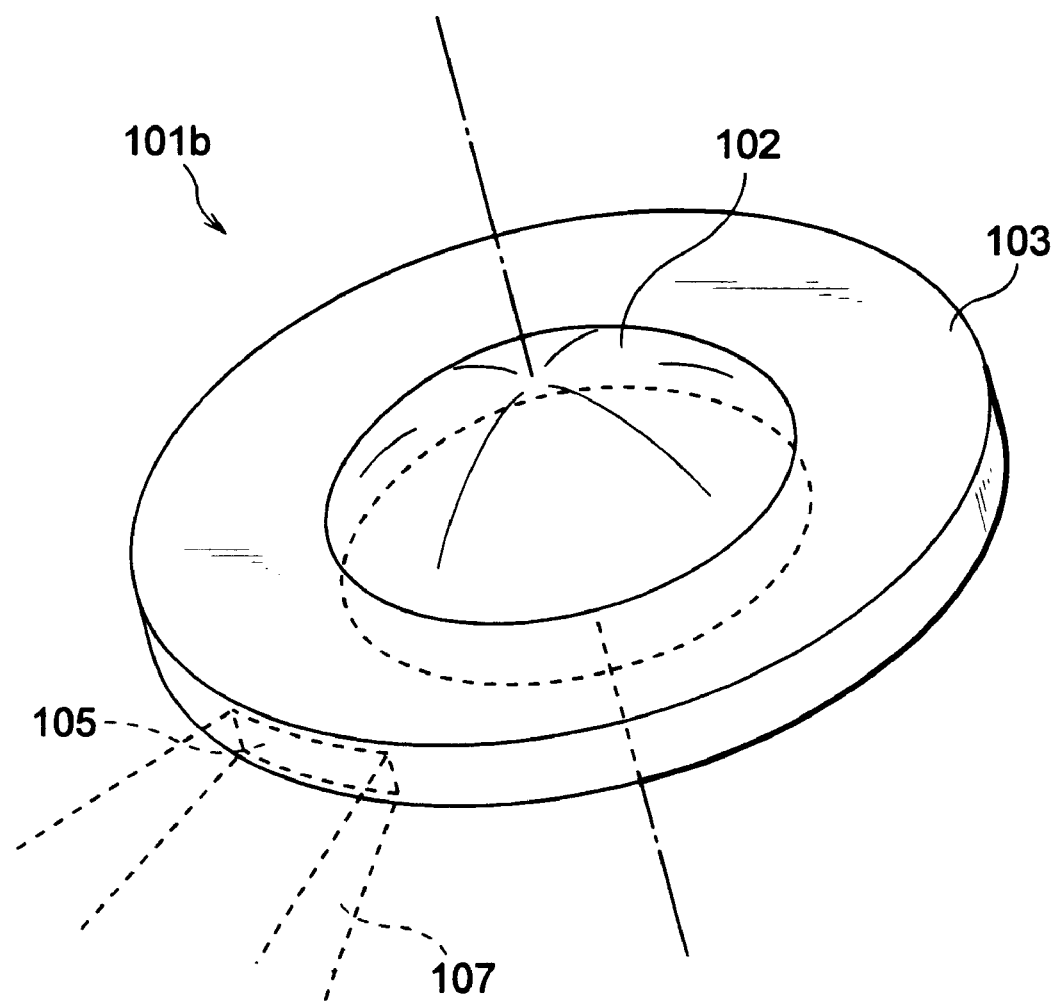
FIG. 11 is a perspective view showing a thinned and downsized plastic lens (second example).

Though the lens may be made free of the annular wall as shown in FIG. 11, the opening area of the gate would become smaller thereby, thus reducing the amount of molten resin that can be injected into the cavity per unit time. Consequently, the molding cycle itself becomes longer. Thus, even if the molten resin can fill the molding space for forming the optically functioning portion at early stage, the solidification of molten resin will progress before the filling is completed. As a result, thus molded plastic lens 101b may not exhibit a favorable optical precision. The mark of the opening area of the gate formed on the manufactured lens 101b as a cut-off portion 105 by cutting off a superfluous part 107 molded at the injection-gate.

The present invention has been attained in view of these points. Embodiments of the plastic lens in accordance with the present invention will be explained with reference to the accompanying drawings in the following.

A plastic lens 1a, which is a lens having a diameter of about 5 mm used for an optical pickup or the like of a CD-ROM drive and so forth, has an optically functioning portion 2, functioning as a convex lens, at its center. Formed around the optically functioning portion 2 is a flange 3 which becomes an attachment when the lens 1a is fixed to a holder on the drive. The flange 3 has a uniform thickness and is formed around the optically functioning portion 2 in a brim-like form. A gate-positioned projection 4 is on the surface of the flange 3. And a cut-off portion 5 is formed on a side face of the gate-positioned projection 4. The cut-off portion 5 is formed by cutting off a superfluous part 7 molded at an injection-gate.

The gate-positioned projection 4 has a substantially trapezoidal sectional figure and is curved along the outer peripheral portion of the flange 3. The gate-positioned projection 4 is formed such that the center angle α (see FIG. 2) becomes 45°. The center angle α is formed between lines respectively connecting both ends of the gate-positioned projection 4 to the center axis of the lens 1a. On the other hand, a protect projection 6 is formed at the symmetrical position to the gate-positioned projection 4 with respect to the center of the lens 1a. Though in the same form as the gate-positioned projection 4, the protect projection 6 does not have the cut-off portion 5 formed on its side face.

Figure 2:
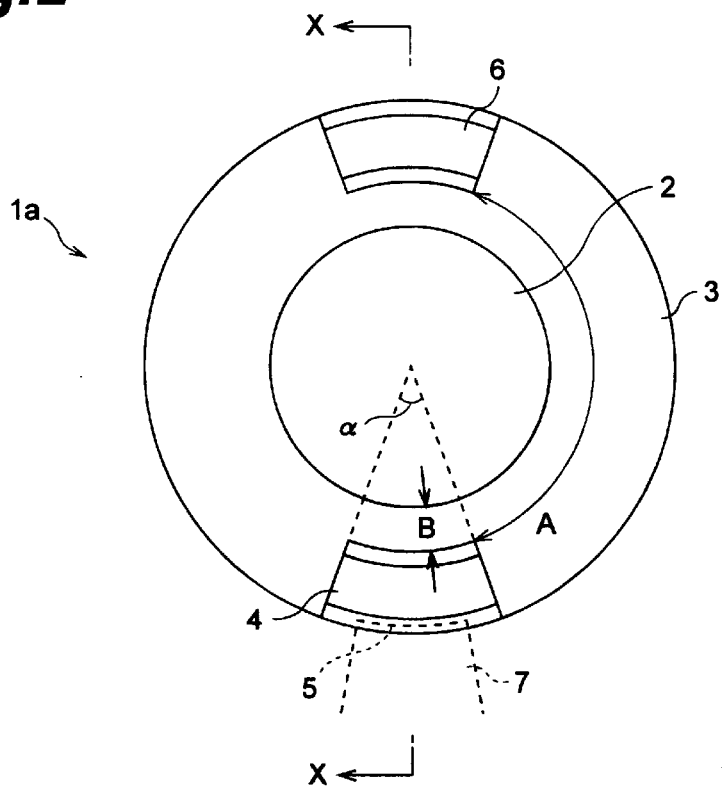
FIG. 2 is a plan view of the plastic lens shown in FIG. 1.
Figure 3:
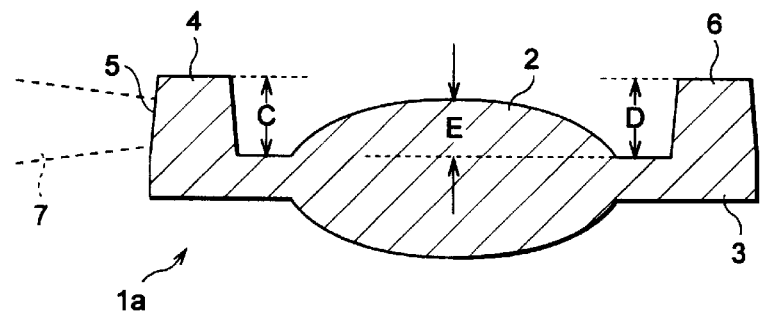
FIG. 3 is a sectional view taken along the line 3—3 of FIG. 2.

As shown in FIG. 2, on the surface of the flange 3, the circumferential shortest distance A between the gate-positioned projection 4 and the gate-preventing projection 6 is made longer than the shortest distance B between the gate-positioned projection 4 and the optically functioning portion 2. Also, as shown in FIG. 3, on the basis of the surface of the flange 3, the height C of the gate-positioned projection 4 and the height D of the protect projection 6 is made greater than the height E of the optically functioning portion 2. As a consequence, an object such as CD-ROM disc would come into contact with the gate-positioned projection 4 and protect projection 6 before contacting the optically functioning portion 2, whereby the optically functioning portion 2 is prevented from being damaged.

The process of making the plastic lens 1a will now be explained briefly with reference to FIG. 4.

Upon injection-molding the lens 1a, a resin suitable as a lens material, such as polymethyl methacrylate (PMMA), is molten, and thus molten resin is injected into a cavity of a die through a injection-gate 50. At this time, the gate 50 opens at a position facing a molding space 40 for forming the gate-positioned projection 4 within the cavity. Consequently, the opening area of the gate 50 can be sufficiently secured, whereby a sufficient amount of molten resin can be injected into the cavity per unit time. The cut-off portion 5 is formed on a side face of the gate-positioned projection 4 in the molded lens 1a. The gate 50 may also be positioned such that the cut-off portion 5 of the molded lens 1a is formed so as to extend from a side face of the gate-positioned projection 4 to a side face of the flange 3.

Figure 4:
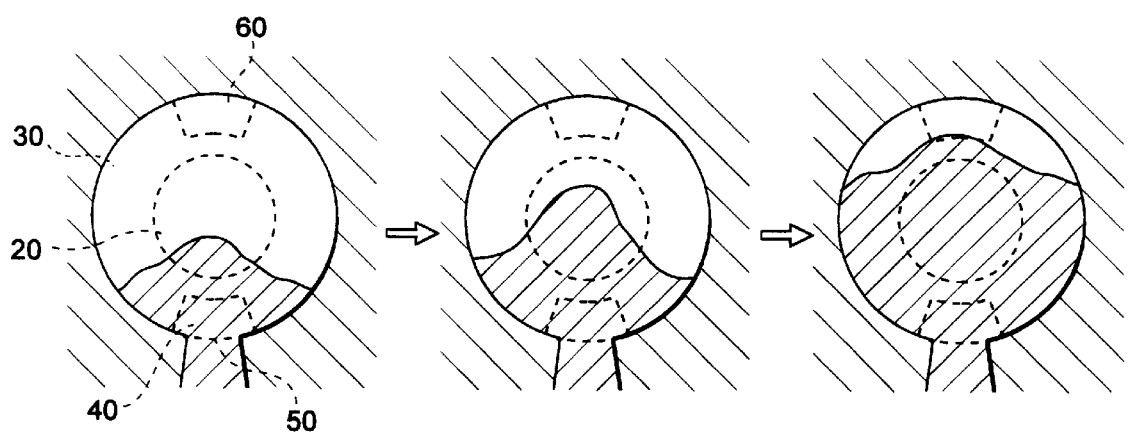
FIG. 4 is a transverse sectional view showing manufacturing steps of the plastic lens shown in FIG. 1.

As shown in FIG. 4, the molten resin injected from the gate 50 initially fills the molding space 40 for forming the gate-positioned projection 4, and then fills the molding space 30 for forming the flange 3 surrounding the molding space 40. Two flows are generated in the molten resin filling the molding space 30 for forming the flange 3, one is directly advancing in the direction of injection toward the molding space 20 for forming the optically functioning portion 2, another is advancing along the inner side face of the cavity facing to the molding space 30 for forming the flange 3. Here, since the distance A (the circumferential shortest distance between the gate-positioned projection 4 and the protect projection 6) is made longer than the distance B (the shortest distance between the gate-positioned projection 4 and the optically functioning portion 2), the molten resin would reach the molding space 20 for forming the optically functioning portion 2 before reaching the molding space 60 for forming the protect projection 6. And then, the molding space 20 for forming the optically functioning portion 2 is completely filled with the molten resin at earlier stage. Thereafter, the molten resin fills the remaining molding space 30 for forming the flange 3 and the molding space 60 for forming the protect projection 6.

Since the molten resin is caused to fill the molding space 20 for forming the optically functioning portion2 at an early stage, thus molded lens 1a can be provided with a favorable optical precision. In order for the molten resin to fill the molding space 20 for forming the optically functioning portion 2 at an earlier stage, the above-mentioned center angle α is preferably within the range of 30° to 90°. When the center angle α is less than 30°, the area of the cut-off portion 5 (i.e., the opening area of the gate 50) may become too small to inject a sufficient amount of molten resin into the cavity per unit time. By contrast, when the center angle α exceeds 90°, the gate-positioned projection 4 may have such a large volume that the solidification of molten resin tends to progress before filling the molding space 20 for forming the optically functioning portion 2.

Unless the molten resin fills the molding space 20 for forming the optically functioning portion 2 at an early stage, the solidification of molten resin would progress. Consequently, the optical precision of the molded lens may deteriorate because of the fact that the lens cannot faithfully reproduce the inner surface form of the cavity, that the flows of resin whose solidification has progressed do not adhere to each other when joining together, that the molecular orientation in the resin becomes biased, and so forth. For avoiding these problems, it is important that the molten resin fill the molding space 20 for forming the optically functioning portion 2 at an early stage.

Figure 1:
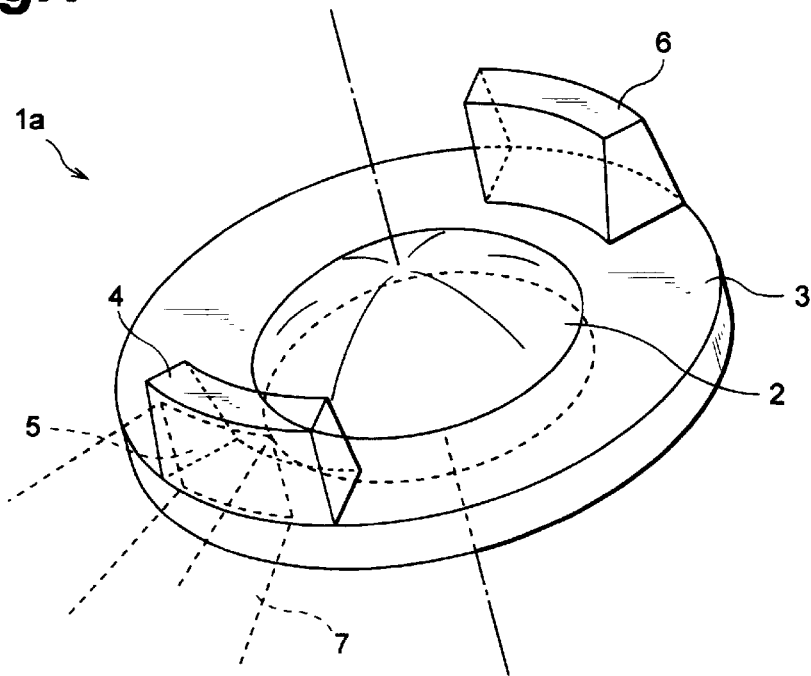
FIG. 1 is a perspective view showing a first embodiment of the plastic lens in accordance with the present invention.

Thus molded lens 1a is cooled and solidified within the die, and then is removed from the die. After the lens 1a is further cooled and solidified, the superfluous part 7 formed at the position of the gate 50 is cut off. The cut-off portion 5 is thus formed at the site where the superfluous part 7 has been cut off (see FIG. 1). Here, the gate-positioned projection 4 and the protect projection 6 may be formed on both front and rear surfaces of the flange 3 as well.

Other embodiments of the plastic lens in accordance with the present invention will now be explained. In the following, parts different from those in the above-mentioned lens 1a shown in FIG. 1 will be explained in particular, whereas the parts identical or equivalent to those of the lens 1a shown in FIG. 1 will be referred to with numerals identical thereto without their detailed descriptions repeated.

Figure 5:
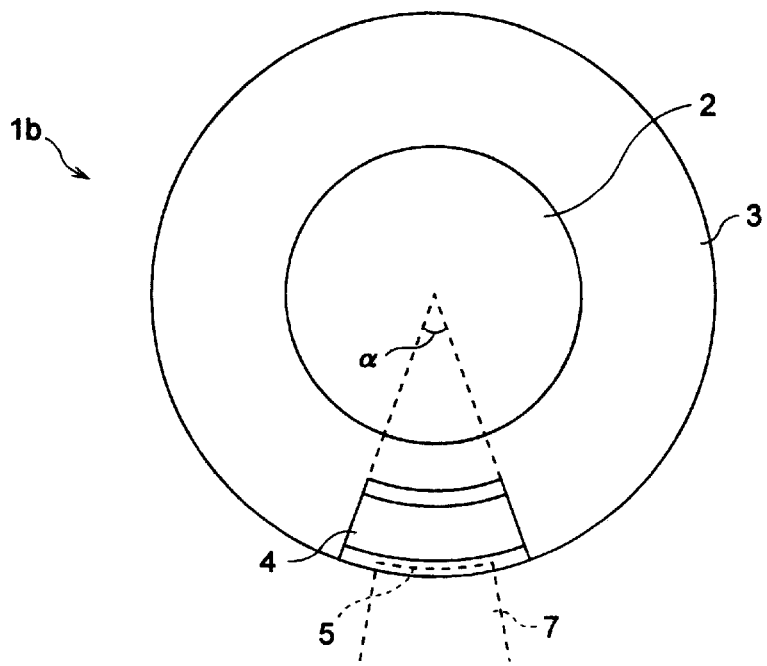
FIG. 5 is a plan view showing a second embodiment of the plastic lens in accordance with the present invention.

A plastic lens 1b shown in FIG. 5 has a gate-positioned projection 4 on the surface of its flange 3, but does not have a protect projection. In the case where the lens 1b is placed at a position where it has no possibility of coming into contact with other objects, such a configuration yields no problem in particular.

Figure 6:
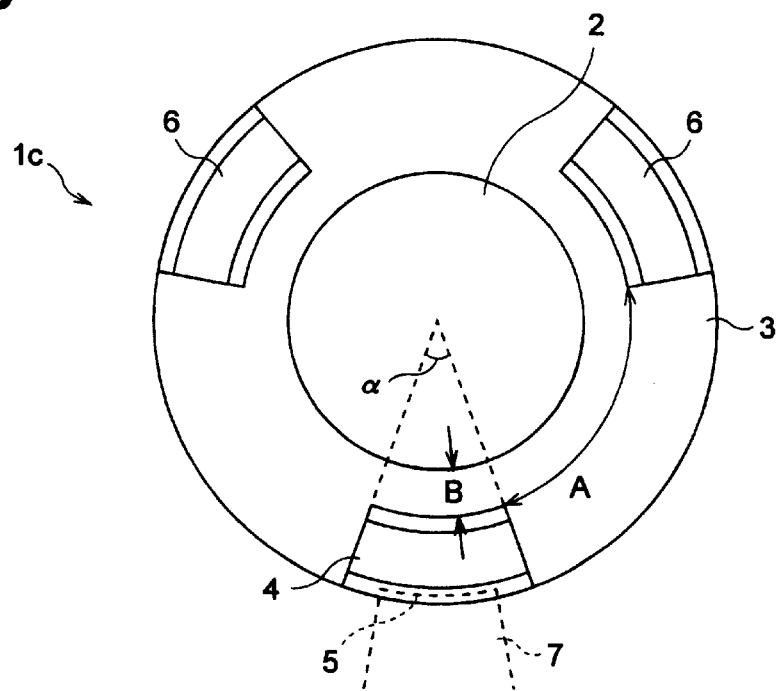
FIG. 6 is a plan view showing a third embodiment of the plastic lens in accordance with the present invention.

A plastic lens 1c shown in FIG. 6 has two protect projections 6. Here are three projections in total of the gate-positioned projection 4 and the protect projections 6. Those three projections are preferably disposed around the optically functioning portion 2 at equally spaced intervals. When these projections are disposed at equally spaced intervals, a object such as CD-ROM disc can be effectively prevented from coming into contact with the optically functioning portion 2. Also, in the lens 1c, the distance A on the surface of the flange 3 is made greater than the distance B. Consequently, within the cavity upon molding the lens 1c, the molten resin can fill the molding space for forming the optically functioning portion at an early stage.

Figure 7:
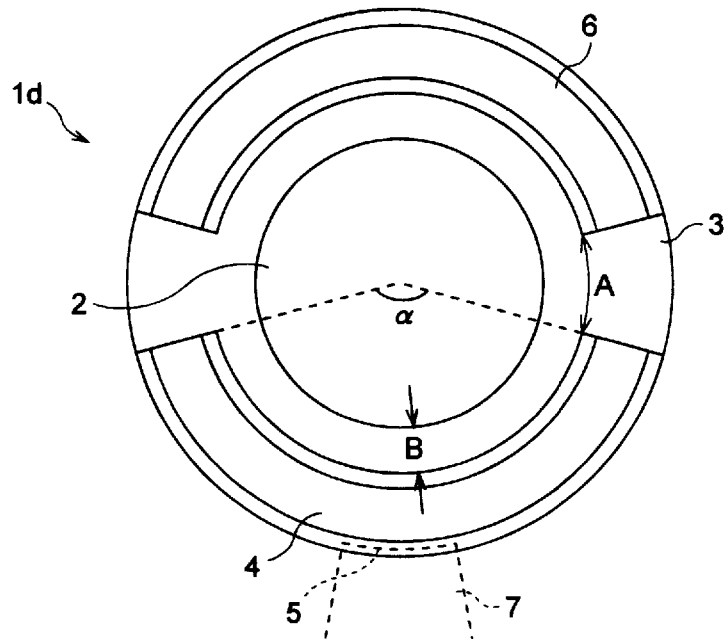
FIG. 7 is a plan view showing a fourth embodiment of the plastic lens in accordance with the present invention.

In a plastic lens 1c shown in FIG. 7, the areas formed with the gate-positioned projection 4 and the protect projection 6 are made wider. Though center angle α of the gate-positioned projection 4 is preferably set within the above-mentioned range of 30° to 90° in order to fill the molding space for forming the optically functioning portion 2 with the molten resin at an early stage, the gate-positioned projection 4 exceeding the above-mentioned range as shown in FIG. 7 is practically tolerable as well. Also, in this lens 1d, the distance A is made greater than the distance B, thereby allowing the molding space for forming the optically functioning portion 2 to be filled with the molten resin at an early stage upon molding. Here, since the molten resin fills the molding space for forming the protect projection 6 after filling the molding space for forming the optically functioning portion 2, the center angle of the protect projection 6 would hardly influence the optical precision of the lens.

Though each of the above-mentioned lenses is a small-sized lens used for an optical pickup of a CD-ROM drive and the like, the application of the plastic lens of the present invention should not be restricted to that of the above-mentioned lenses. Also, the size of the plastic lens in accordance with the present invention should not be restricted to that of the above-mentioned lenses. In particular, the present invention can be suitably used for a lens having the large difference between the thickness of the optically functioning portion and the thickness of the flange.

Since the plastic lens in accordance with the present invention has a flange formed around the optically functioning portion, a gate-positioned projection formed on a part of the surface of the flange, and a cut-off portion formed at a side face of the gate-positioned projection, it is easy to mold and has a favorable optical precision.

Also, since the method of making a plastic lens in accordance with the present invention uses a molding die whose cavity comprises a molding space for forming the optically functioning portion, a molding space for forming the flange, and a molding space for forming the gate-positioned projection. And the molding die has a injection-gate opening to the molding space for forming the gate-positioned projection. Thus, a molded plastic lens can have a favorable optical precision, and can be molded easily.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A plastic lens comprising:

an optically functioning portion;

a flange surrounding said optically functioning portion;

a gate-positioned projection on a part of a surface of said flange; and a cut-off portion located at a side face of said gate-positioned projection and formed by cutting off a superfluous part molded at an injection-gate.

2. The plastic lens according to claim 1, including at least one protect projection on said surface of said flange, said gate-positioned projection and said protect projection each having a height, relative to said surface, greater than a maximum height of said optically functioning portion.

3. The plastic lens according to claim 2, wherein a distance between said gate-positioned projection and said protect projection adjacent to said gate-positioned projection is larger than a distance between said gate-positioned projection and said optically functioning portion on said surface of said flange.

4. The plastic lens according to claim 1, wherein said gate-positioned projection has a center angle within a range of 30° to 90°.

5. A method of making a plastic lens, said method comprising molding said plastic lens by injecting a molten resin into a molding die having a cavity, through an injection-gate, the cavity comprising a molding space for forming an optically functioning portion, a molding space for forming a flange surrounding said optically functioning portion, and a molding space for forming a gate-positioned projection on a part of a surface of said flange, said injection-gate communicating with said molding space for forming said gate-positioned projection.

* * * * *